June 1, 1965 R. A. HORTON 3,186,041
CERAMIC SHELL MOLD AND METHOD OF FORMING SAME
Filed Nov. 14, 1961 3 Sheets-Sheet 1

INVENTOR.
ROBERT A. HORTON
BY Watts & Fisher

ATTORNEY

June 1, 1965    R. A. HORTON    3,186,041
CERAMIC SHELL MOLD AND METHOD OF FORMING SAME
Filed Nov. 14, 1961    3 Sheets-Sheet 2

INVENTOR.
ROBERT A. HORTON
BY Watts & Fisher
ATTORNEY

United States Patent Office 3,186,041
Patented June 1, 1965

3,186,041
CERAMIC SHELL MOLD AND METHOD OF FORMING SAME
Robert A. Horton, Chesterland, Ohio, assignor to Precision Metalsmiths, Inc.
Filed Nov. 14, 1961, Ser. No. 152,241
16 Claims. (Cl. 22—129)

This application is a continuation-in-part of my copending application, Serial No. 51,072, filed August 22, 1960, and entitled "Method of Form Removal From Precision Casting Shells," now Patent 3,094,751 issued June 25, 1963, which is a continuation-in-part of my copending application Serial No. 12,899, filed March 7, 1960, now Patent No. 3,018,528 and entitled "Method of Form Removal From Precision Casting Shells."

The present invention relates generally to the art of investment casting, and more specifically to improvements in ceramic shell mold techniques of precision casting wherein shell molds suitable for casting metal are prepared by building up layers of refractory material around disposable patterns of synthetic resin which are then removed without disrupting the shell molds.

As is known to those familiar with the art of investment casting, there is a growing trend in the industry to use ceramic shell molds in place of the conventional bulky investment molds. This development of ceramic shell mold techniques has been prompted by the decided advantages which shell molds offer in many applications. For example, as compared with conventional investment molds, shell molds are lighter and easier to handle, exhibit increased permeability and thermal shock resistance, provide for easier knock-out and clean-up after casting, do not require flasks, and provide greater flexibility in processing.

According to the processes disclosed in my above-identified applications, shell molds may be prepared by dipping a disposable pattern in a refractory slurry consisting essentially of a refractory powder and a suitable binder solution capable of hardening during drying at room conditions. After dipping, the excess slurry is drained from the pattern and the slurry coating sanded or stuccoed with coarser refractory particles. This process of dipping and stuccoing is repeated until a refractory shell having a sufficient thickness to resist the stresses occurring in subsequent operations is built up around the pattern. The usual thickness is from ⅛ inch to ½ of an inch, although thinner or heavier shells may be formed for special situations. The disposable pattern is subsequently removed from the shell mold and the mold prepared for the casting operation.

A critical stage in the preparation of ceramic shell molds is the elimination of the pattern material. The usual pattern materials expand when heated at a much higher rate than does the refractory shell. Consequently, if the relatively thin shell mold is heated to melt out the pattern, as is customary with the larger and bulkier investment molds, the expansion forces of the confined pattern material tend to crack the shell.

This tendency toward mold cracking has been largely overcome in the case of wax patterns by a procedure known as "flash dewaxing." According to this procedure, the shell is placed directly in a furnace at an elevated temperature, for example from 1600° to 1800° F. Under these conditions, the heat transfer through the shell is so rapid that a surface skin of wax melts before the bulk of the wax can heat up to expand and crack the shell. As the bulk of the wax does heat up, the molten surface material either flows out of the mold or soaks through the shell. This provides a space to accommodate the subsequent expansion of the bulk of wax so that it will not crack the shell.

However, prior to the inventions of my above-identified copending applications, attempts to use patterns formed of synthetic resins instead of wax patterns in conjunction with shell molds were largely unsuccessful, since synthetic resins do not satisfactorily respond to flash dewaxing procedures. Possibly the surface skin of a plastic pattern does not soften as it should, or if it does, it is not fluid enough to soak into the mold. In any case, it has been found that shell molds are subject to large pressures from the heated and expanding plastic material and thus frequently distort and/or crack during removal of the plastic patterns by heating.

The problem of removing patterns of synthetic resin persisted in spite of recognized advantages of plastic patterns in many applications. Plastic patterns can be made by injection molding equipment at much higher production rates than obtained with wax pattern forming operations. In addition, plastic patterns can be handled easily without breaking and do not crack at low temperatures or soften at high temperatures normally encountered.

According to the invention disclosed in my copending application, Serial No. 12,899, a result similar to flash dewaxing is obtained by allowing a resin solvent to penetrate the shell mold and soften the surface of the plastic pattern. With the surface sufficiently softened, heat is applied to burn off the remaining plastic material without danger of cracking the shell. This process, although quite successful in many applications, was found in practice not to be suitable for all types of plastic patterns and "tree" assemblies of plastic patterns. For example, while the individual plastic patterns were found to respond quite well to the solvent action, the progressively softening plastic tended to develop fluid pressure in each individual pattern cavity. In certain situations, the combined fluid pressures of large numbers of pattern cavities has actually caused the entire side wall of the shell to break loose and to destroy the entire tree assembly. There were other similar limitations whenever certain sizes and configurations of shells were attempted.

Copending application, Serial No. 51,072 shows that this problem of the development of fluid pressure in the pattern cavities can be relieved by initially exposing only the root end of the pattern to the solvent. In this manner, the plastic material may be caused to continually drain from the cavities without developing a detrimental fluid pressure. The tree assemblies are formed by placing a wax coating on a hollow metal form and embedding the ends of the patterns in the wax coating. The shell mold is then built up around the tree assembly by the repeated process of dipping and stuccoing, as described above. Thereafter, the hollow metal form is removed from the shell by melting the wax coating and a suitable solvent, such as methyl ethyl ketone, is applied to the exposed ends of the patterns, as by placing the ceramic shell with the embedded plastic patterns in a bath of solvent. The solvent immediately commences to attack the patterns at their exposed ends and continues working inwardly until the patterns are substantially completely softened or dissolved.

The foregoing procedure of pattern removal has been successfully practiced and represents a definite improvement over prior art techniques. However, it has been found that, because of the permeability of the mold, the solvent still has a tendency to penetrate the mold and act on the patterns and cause a pressure buildup. Depending upon the permeability of the mold and such considerations as pattern size and configuration, this action of the solvent may soften the patterns to develop fluid pressure in the pattern cavities before the root ends of the patterns have been dissolved a sufficient amount to permit the plastic material to flow from the cavities. In such situations, there has been some tendency toward cracking of the shell mold even though the solvent is primarily applied only to the root ends of the patterns.

An object of the present invention is to provide improvements in ceramic shell molds suitable for casting metal by precision casting techniques.

Another object of the invention is to overcome the tendency toward cracking of ceramic mold shells when removing disposable patterns therefrom.

A more specific object of the invention is to provide improvements in the manufacture of ceramic shell molds which obviate the tendency toward mold cracking when patterns of synthetic resins are removed therefrom.

Another specific object of the invention is to provide improved shell molding techniques involving the use of patterns of synthetic resins wherein the patterns are removed from the shells by the unidirectional action of a suitable resin solvent that is applied to the root ends of the patterns.

In the present invention, a refractory shell mold is built up around a pattern of synthetic resin by the usual steps of dipping the pattern in a suitable refractory slurry and then sanding or stuccoing the slurry coating, the dipping and stuccoing steps being repeated until a plurality of layers of refractory material have been formed around the pattern. One or more of these refractory layers is impregnated with a suitable solvent-proof material. This solvent-proof material is then hardened to form a solvent-impervious barrier film that surrounds the pattern. When the shell mold is thereafter placed in a solvent bath, the barrier film prevents the solvent from acting on any other portion of the pattern except its root end, and consequently avoids any tendency toward the creation of fluid pressure in the pattern cavity.

According to the preferred practice of the invention, the material used for impregnating the mold shell is a metal salt capable of drying from a water solution to form an amorphous, glass-like film. In addition to rendering the mold shell substantially impervious to a resin solvent, the impregnation of the molds with metallic salts of the type described has been found to improve their general strength, as well as other casting properties. Consequently, shell molds made in this manner can be used to advantage regardless of the particular pattern material and the manner of removing the patterns from the mold.

Since the formation of the barrier film prevents the development of internal stresses in the pattern cavity due to fluid pressure, it has been found that the refractory shell may be thinner than heretofore possible. For example, suitable refractory shell molds have been formed only with two or three layers of the refractory material instead of the customary five or six. This advantage not only reduces the cost of the casting operation, but provides for higher production rates since the molds can be built up around the patterns in a much shorter time.

Other objects and advantages of the invention will become apparent from the following detailed description and accompanying drawings.

Figure 1:
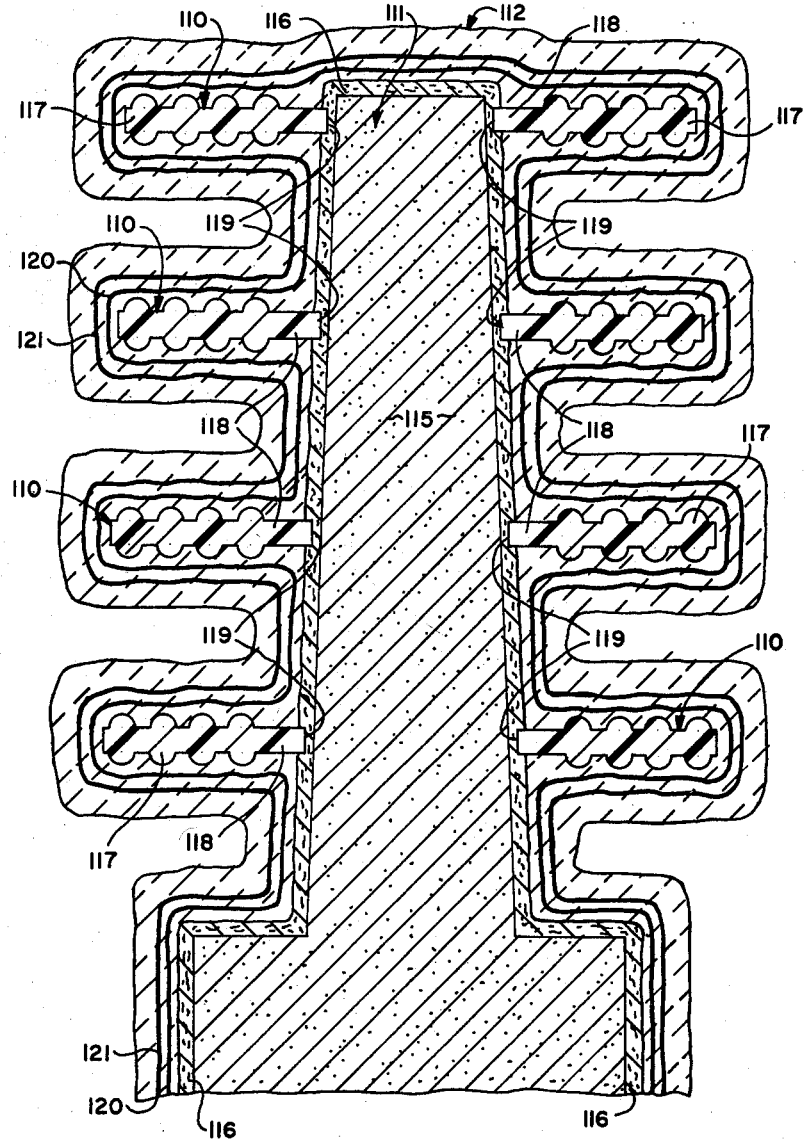
FIGURE 1 is a vertical cross sectional view of a tree assembly embedded within a refractory shell mold that has been formed in accordance with the present invention.

Referring first to FIG. 1, there is shown a plurality of pattern assemblies 110 which are connected to a pattern support to form a tree assembly 111. This tree 111 is embedded in a refractory shell 112 suitable for casting metal.

In the illustrated example of the invention, the pattern support comprises a solid form 115 having a relatively thin, external coating 116. The solid form 115, which defines the mold sprue, may be conveniently made of a wax that is preferably resistant to the action of the pattern solvent, but which can be removed from the shell 112 by melting. For reasons which will hereinafter be made apparent, the coating 116 is preferably formed of a material, such as wax or the like, which can be readily dissolved by a pattern solvent.

Each of the pattern assemblies 110 includes a pattern 117 corresponding to the desired shape of the cast article and the necessary gate 118 and risers (not shown). These pattern assemblies 110 are formed of a synthetic resin, such as polystyrene or the like, which can be dissolved from the shell 112 by the action of a suitable resin solvent. The tree 111 is formed by softening the coating 116, as by heating or the like, at selected locations and embedding the free ends 119 of the gates 118 in the softened areas. Thus formed, the tree assembly is ready to be embedded in the refractory shell 112.

According to procedures generally discussed above, the shell 112 may be formed by dipping the tree assembly 111 in a refractory slurry consisting essentially of a suspension of a refractory powder, such as zircon (zirconium silicate) and fused silica in a binder solution comprised mainly of colloidal silica sol and small amounts of an organic film former, a wetting agent and a defoaming agent. After each dipping step, the excess slurry is allowed to drain from the tree assembly 111 and the slurry coating is stuccoed or sanded with refractory particles. Suitable refractory materials employed for stuccoing include granular zircon, fused silica, silica, various aluminum silicate grogs including mullite, sillimanite, fused alumina, tabular aluminum and similar materials.

When the above dipping and stuccoing steps have been carried out, the slurry coating is hardened, as by forced air drying, to form a refractory layer around the tree assembly. This sequence of operations is then repeated as many times as necessary to build up a shell having the thickness and strength required for the particular casting operation.

In accordance with the present invention, one or more of the refractory layers making up the shell 112 is at least partially impregnated with a solvent-proof material for preventing the pattern solvent from penetrating the shell and acting on the pattern assemblies. Best results have been obtained by applying the solvent-proof material to at least two refractory layers, and preferably to the innermost refractory layers closest to the pattern assemblies 110. Good results have also been obtained, however, by coating only the outer refractory layer of the shell 112.

For the purposes of the present invention, the solvent-proof material should be capable of forming a solvent-impervious barrier film which will prevent any significant penetration of the pattern solvent. At the same time, the solvent-proof material should not disrupt the structural continuity of the shell 112 and weaken it. This barrier film that is formed also should be capable of being destroyed by heating so that the gases which are subsequently developed during casting can escape from the pattern cavities through the walls of the shell mold.

The preferred class of materials for impregnating the mold shells are metal salts capable of drying from a water solution to form an amorphous, glass-like film. Suitable materials of this class are metal salts of organic acids, including basic aluminum formate, zirconium acetate, and the like. An aqueous solution of basic aluminum formate has been found particularly satisfactory and is therefore preferred, although other materials having the general properties discussed above may be used.

The solution of solvent-proof material may be applied to the refractory layers of the shell by dipping, spraying or brushing and then allowed to air harden to form the glass-like barrier film. The formation of two such barrier films is indicated by lines 120 and 121 in FIG. 1.

Figure 2:
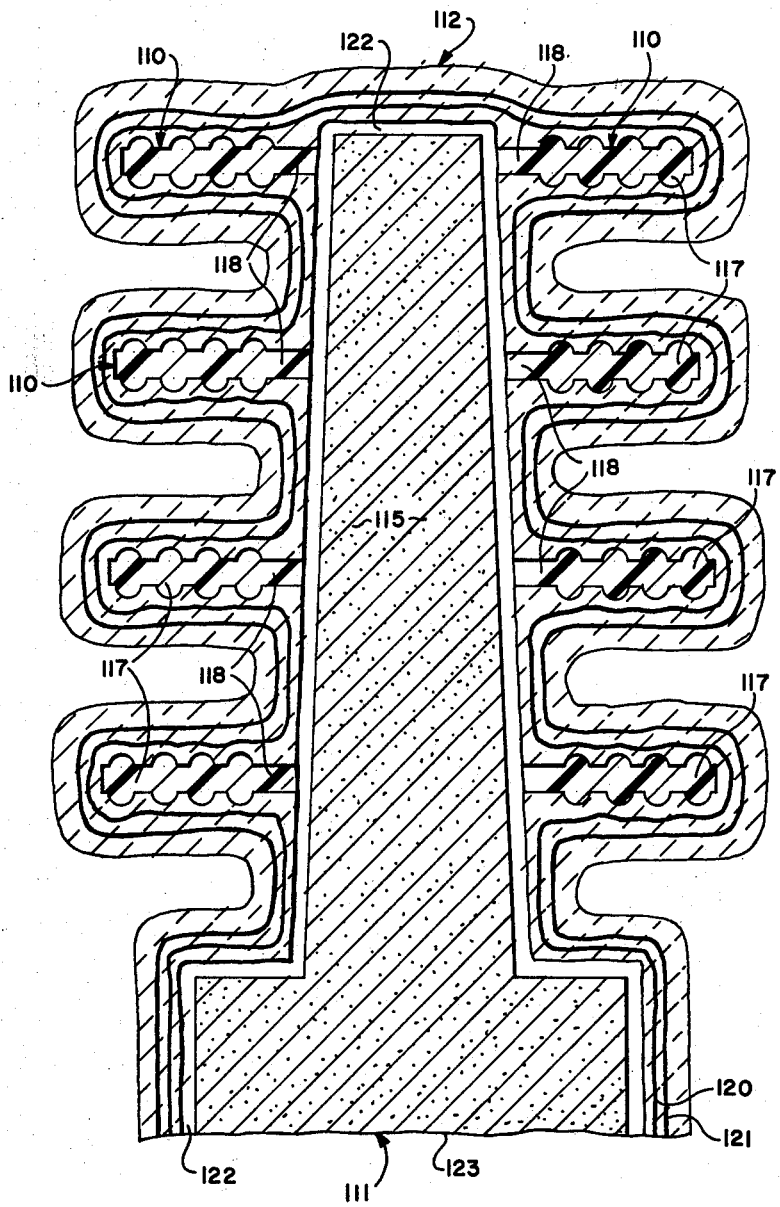
FIGURE 2 is a sectional view similar to FIG. 1 illustrating the mold after the root ends of the pattern assemblies have been exposed; and, FIGURE 3 is a vertical cross sectional view of a shell mold and tree assembly formed in accordance with a modified embodiment of the present invention.

Following the formation of the refractory shell 112 and the barrier films 120 and 121, the plastic pattern assemblies 110 are removed from the mold by at least partially dissolving them with a resin solvent, such as trichloroethylene, methyl ethyl ketone, or the like. This may be accomplished by placing the mold assemblies in a bath of such solvent. As illustrated in FIG. 2, the solvent first acts on the exposed end 123 of the tree assembly 111 to progressively dissolve the coating 116 of the pattern support and thereby provide a space 122 between the wax form 115 and the inside walls of the shell 112. The initial removal of the coating 116 exposes the root ends 119 of the pattern assemblies to the solvent in the space 122 which then commences to unidirectionally attack the pattern assemblies at their exposed ends.

This unidirectional dissolving action of the pattern assemblies progresses toward the closed ends of the pattern cavities. At the same time, the removed material is continually floated out of the pattern cavities into the space 122 and then from the mold itself. Since the barrier films 120 and 121 prevent any significant penetration of the solvent through the walls of the shell to soften the patterns, it will be seen that a development of fluid pressure in the cavities is prevented.

The dissolving action is allowed to progress in the manner described until the pattern assemblies have been substantially completely dissolved or at least sufficiently softened and destroyed so that they cannot expand under heat to break the shell 112. The length of time required for the pattern removal step depends, of course, upon the size of the patterns, the particular synthetic resins from which they are formed, and other similar factors.

It has been found that the process of removing the soluble plastic pattern assemblies 110 can be materially speeded up by using a solvent, such as trichloroethylene, having a higher specific gravity than the plastic so that the removed plastic material will float to the surface of the solvent bath. This assures that the plastic material will be continually floated out of the pattern cavities and from the mold 112 to thereby continually expose undissolved plastic to a constantly renewed fresh solvent solution.

After the plastic pattern assemblies have been substantially completely dissolved or softened, the shell 112 is removed from the solvent bath and heated to between 1600° and 1800° F. This heating at an elevated temperature "sets" the shell 112 to make it suitable for the casting of metal and melts out the wax form 116 and any remaining pattern material. In addition, the heating of the mold serves to destroy the barrier films 120 and 121 by decomposing the solvent-proof material to a metallic oxide. In this manner, the shell 112 is rendered sufficiently pervious so that the gases which are developed in the pattern cavities during casting can escape through the walls of the mold.

Figure 3:
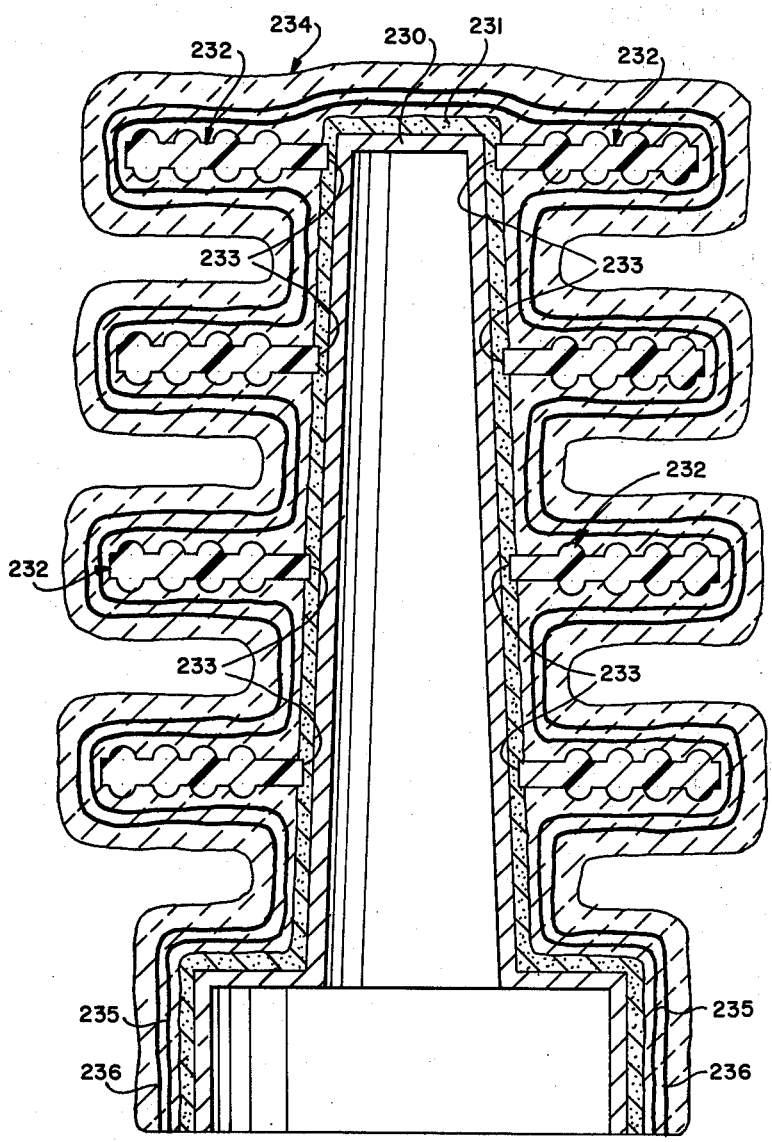

Reference is now made to FIG. 3 which illustrates a modified practice of the invention. In this embodiment, the pattern support is formed by a hollow metal shell 230 having an external coating 231 which is preferably soluble in the resin solvent. A plurality of plastic pattern assemblies 232 are connected to the pattern support by embedding their free ends 233 in the coating 231 at selected locations. A refractory shell 234, including suitable barrier films 235 and 236 of solvent-proof material, is formed around the pattern assemblies and pattern support in the manner discussed in connection with the embodiment of FIGS. 1 and 2.

The pattern assemblies 232 are removed from the molds 234 by placing the mold 234 in a bath of resin solvent. As in the case of the previously described pattern removal process, the solvent first acts to dissolve the coating 231 and to then unidirectionally attack the pattern assemblies 232 at their exposed end portions 233. After removal of the pattern assemblies in this manner, the metal form 230 can simply be slipped from the shell 234 and the shell heated to destroy the barrier films and prepare the mold for casting.

It will thus be seen that the invention provides techniques for effecting the removal of patterns of synthetic resin from shell molds without distorting and/or cracking the molds. These improved techniques are characterized by the formation of a solvent-proof, impervious barrier film in the walls of the mold and by the resulting, unidirectional dissolving action of the pattern solvent which prevents mold cracking due to fluid pressure heretofore created in the pattern cavities. This unidirectional dissolving action of the plastic pattern assemblies is such that the pattern material is continually removed from the pattern cavities and from the mold. At the same time, the barrier film prevents the solvent from penetrating through the walls of the mold shell and attacking the pattern assemblies to thereby create a fluid pressure that would be trapped in the pattern cavities.

As generally discussed above, the impregnation of one or more layers of the refractory mold shell with a metal salt capable of forming an amorphous, glass-like film increases the strength of the mold shell. In many applications, as, for example, those involving the casting of stainless steels, impregnated mold shells have also been found to produce castings having smoother surfaces than can be obtained with unimpregnated mold shells. It is believed that this improvement in the surface smoothness is attributable to the metallic oxide of the decomposed film which tends to prevent the hot metal from reacting with the mold when the metal is poured. Thus, the improved shell mold construction provided by the invention can be advantageously used in many different precision casting applications, including those involving wax patterns which are removed by conventional procedures.

Many modifications and variations of the invention will be apparent to those skilled in the art in view of the foregoing detailed description. Therefore, it is to be understood that, within the scope of the appended claims, the invention may be practiced otherwise as that specifically shown and described.

What is claimed is:

1. In a process of building a shell mold around a disposable pattern formed of a soluble synthetic resin and then removing the pattern from the mold, the steps of embedding said pattern in a porous shell of refractory material, treating said shell to render it impervious to a solvent for the synthetic resin so that the solvent cannot penetrate through the walls of said mold, providing access to a portion of said pattern, and exposing said shell and embedded pattern to a pattern liquid solvent for the synthetic resin until said pattern is substantially completely dissolved.

2. In a process of building a shell mold around a pattern formed of a soluble synthetic resin and removing said pattern by a liquid pattern solvent for the synthetic resin, the steps of embedding said pattern in a porous shell of refractory material, impregnating the walls of said porous shell with a solution of material insoluble in pattern solvent to form a liquid impervious barrier film, providing access to a portion of said pattern, and exposing said mold and embedded pattern to the liquid pattern solvent until said pattern is substantially dissolved.

3. The process as claimed in claim 2 including the step of heating said shell after the pattern has been dissolved to destroy said barrier film so that gases developed during casting can escape through the walls of said porous shell.

4. In a process of precision casting, the steps of providing a disposable pattern of soluble synthetic resin, applying a refractory slurry to said pattern, hardening said slurry to form a porous refractory layer, treating the hardened refractory layer with a coating solution, the solute of said coating solution being a material which is insoluble in a solvent for the synthetic resin and which is capable of forming a heat-destructible barrier film impervious to the resin solvent, drying said solution to form the solvent-impervious barrier film, forming additional layers of refractory material around said pattern to complete a shell mold coating at least one of said additional layers with said solution, drying said last-mentioned coating to form a second solvent-impervious barrier film, providing access to a portion of said pattern, and placing said mold in contact with a liquid solvent for the synthetic resin until said pattern is substantially dissolved.

5. The process as claimed in claim 4 including the step of heating said mold after the pattern has been substantially dissolved to destroy said barrier films.

6. In a process of precision casting, the steps of providing a pattern support having an exposed area that may be dissolved by a resin solvent, fixing to said exposed area of said support a pattern assembly formed of a soluble synthetic resin, embedding said pattern support and pattern assembly in a porous refractory material suitable for casting metal, treating said refractory material to render it impervious to a solvent for said pattern assembly, and placing the embedded pattern support and pattern assembly in contact with a liquid resin solvent for sequentially dissolving said exposed area and said pattern assembly.

7. In a process of precision casting, the steps of providing a pattern support having an outer surface that may be dissolved in a resin solvent, embedding an end of a pattern assembly of synthetic resin in said outer surface of said support, forming a shell mold by building up a plurality of layers of porous refractory material around said pattern assembly and said pattern support, said mold being formed so that said pattern assembly defines a cavity, coating at least one of said refractory layers to render it impervious to a liquid solvent for the synthetic resin, dissolving said outer surface of said support with a liquid resin solvent to form a space within said mold and expose said end of said pattern assembly, and finally dissolving said pattern assembly by filling said space with said solvent, said dissolving step being characterized by progressive unidirectional attack of said solvent on said pattern through said exposed end, the solvent being prevented from penetrating through the walls of said mold into said cavity by the treated refractory layer.

8. In a process of precision casting, the steps of providing a wax form, coating said form with a material that may be dissolved by a resin solvent, providing a pattern assembly of soluble synthetic resin, embedding one end of said pattern assembly in said coating, forming a shell mold around said wax form and pattern assembly by building up a plurality of layers of porous refractory material suitable for casting metal, said mold being formed so that said pattern assembly defines a cavity, treating at least one of said refractory layers to render it impervious to a liquid resin solvent for the synthetic resin, placing said mold in a bath of resin solvent to dissolve said coating and expose said one end of said pattern assembly and thereafter dissolve said pattern assembly, said dissolving of said pattern assembly being characterized by progressive unidirectional attack of said solvent on said pattern assembly through said one end, the liquid solvent being substantially prevented from penetrating through the walls of said mold into said cavity by the treated refractory layer, and heating said mold to melt said wax form and to restore the porosity of said one refractory layer so that the gases developed during casting can escape through the walls of said mold.

9. In a process of precision casting, the steps of providing a disposable pattern, formed of a soluble synthetic resin building a shell mold around said pattern, said shell mold being formed so that said pattern defines a cavity having an opening and so that a portion of said pattern is presented at said opening, treating said shell mold with a coating solution, the solute of said solution being a metallic salt which is insoluble in a solvent for the synthetic resin and is capable of drying from a water solution to form an amorphous, glass-like film impervious to a liquid resin solvent, and dissolving said pattern from said mold by exposing said mold to a quantity of liquid resin solvent, said dissolving step being characterized by progressive unidirectional attack of said solvent upon said pattern through said cavity opening, the solvent being substantially prevented from penetrating through the walls of said mold by said film.

10. The process as claimed in claim 9 wherein said metallic salt is a metallic salt of an organic acid.

11. In a process of precision casting, the steps of providing a disposable pattern, forming a shell mold around said pattern by building up a plurality of porous layers of refractory material, impregnating at least one of said refractory layers with a metallic salt capable of drying from a water solution to form an amorphous, glass-like film, destroying said pattern, and heating said mold to decompose said film to a metallic oxide.

12. A mold suitable for casting metal comprising a shell of refractory material having walls which define a cavity, said cavity having an opening, said walls being impregnated with an oxide of a metallic salt, said oxide having been formed by decomposition of a metallic salt solution impregnated into said mold walls.

13. In a process of making a refractory shell mold suitable for casting metal, the steps of providing a pattern formed of a soluble synthetic resin, building up layers of porous refractory material around said pattern to form a shell mold, said molding being formed so that said pattern defines a cavity having an opening and so that a portion of said pattern is presented at said opening, treating at least one of said layers to render it impervious to a liquid solvent for the synthetic resin, and substantially dissolving said pattern by exposing said mold to a quantity of liquid solvent for the synthetic resin, said dissolving step being characterized by progressive unidirectional attack of said solvent on said pattern through said cavity opening, the solvent being substantially prevented from penetrating through the walls of said mold into said cavity by the treated refractory layer.

14. The process as claimed in claim 13 including the subsequent step of treating said molds to restore the porosity of said one refractory layer so that the gases developed during casting can escape through the walls of said mold.

15. The process as claimed in claim 13 wherein said treating step comprises applying a coating solution to said one refractory layer, the solute of said solution being a material selected from the group consisting of basic aluminum formate and zirconium acetate.

16. In a process of precision casting, the steps of forming a ceramic shell mold, treating said mold with an aqueous solution of a metallic salt to form a heat-destructible film, said salt being characterized in that it is capable of drying from said solution to form said film, and heating said mold to decompose said film to a metallic oxide.

References Cited by the Examiner

UNITED STATES PATENTS 2,682,092   6/54   Hendricks _____ 22—196

FOREIGN PATENTS 1,053,742   3/59   Germany.
688,652   3/53   Great Britain.
740,159   11/55   Great Britain.
742,361   12/55   Great Britain.
872,641   7/61   Great Britain.

MICHAEL V. BRINDISI, *Primary Examiner.*

MARCUS U. LYONS, *Examiner.*